(12) United States Patent
Pesek et al.

(10) Patent No.: US 6,494,675 B2
(45) Date of Patent: Dec. 17, 2002

(54) FLOW MACHINE FOR A FLUID WITH A RADIAL SEALING GAP BETWEEN STATOR PARTS AND A ROTOR

(75) Inventors: Tomas Pesek, Winterthur (CH); Walter Bolliger, Baar (CH)

(73) Assignee: Sulzer Pumpen AG, Winterthur (CH)

( * ) Notice: Subject to any disclaimer, the term of this patent is extended or adjusted under 35 U.S.C. 154(b) by 0 days.

(21) Appl. No.: 09/752,940

(22) Filed: Dec. 29, 2000

(65) Prior Publication Data

US 2001/0007632 A1 Jul. 12, 2001

(30) Foreign Application Priority Data

Jan. 11, 2000 (EP) .............................. 00810024

(51) Int. Cl.[7] .............................................. F04D 29/16
(52) U.S. Cl. ................... 415/172.1; 415/173.4; 415/174.4; 415/230; 277/411; 277/422; 277/943
(58) Field of Search .......................... 415/170.1, 172.1, 415/173.1, 173.4, 173.6, 174.4, 230; 277/409, 411, 422, 931, 943

(56) References Cited

U.S. PATENT DOCUMENTS

| 4,190,396 A | * | 2/1980 | Tomioka et al. | .......... | 415/172.1 |
|---|---|---|---|---|---|
| 4,398,866 A | * | 8/1983 | Hartel et al. | ............. | 415/173.1 |
| 4,867,638 A |   | 9/1989 | Handtmann |   |   |
| 4,948,336 A |   | 8/1990 | Mosure |   |   |
| 5,171,126 A | * | 12/1992 | Becker et al. | ........... | 415/172.1 |
| 5,871,332 A | * | 2/1999 | Gray et al. | .............. | 415/170.1 |
| 5,873,697 A | * | 2/1999 | Gully | ...................... | 415/172.1 |

FOREIGN PATENT DOCUMENTS

| FR | 1230788 A | * | 9/1960 | .............. | 415/173.4 |
|---|---|---|---|---|---|
| FR | 78204 A | * | 5/1962 | ................. | 277/931 |

* cited by examiner

*Primary Examiner*—Christopher Verdier
(74) *Attorney, Agent, or Firm*—Townsend and Townsend and Crew LLP

(57) ABSTRACT

Self-supporting wear rings (1a, 1b) for fluid flow machines are arranged at a radial sealing gap (18) to a rotor (9), and have an outer jacket surface (3) provided with a wear surface (2). The wear rings (1a, 1b), which are fixed in the axial direction, consist of a material with lower thermal expansion coefficients than their support and lie hollowly on their inner jacket surface, with a first conical holder surface (8) encountering with the apex of its cone a second holder surface (8"), which is designed as a straight shoulder, in the plane of the latter (19) on the axis of rotation or encountering a second holder surface, which is designed as a conical holder surface (8'), at its cone apex on the axis of rotation (20).

23 Claims, 6 Drawing Sheets

FLOW MACHINE FOR A FLUID WITH A RADIAL SEALING GAP BETWEEN STATOR PARTS AND A ROTOR

BACKGROUND OF THE INVENTION

The invention relates to a flow machine for a fluid, comprising a radial sealing gap between stator parts and a rotor, with a self-supporting wear ring, of which the outer jacket surface is provided with a wear surface and which is axially fixed in the direction of the axis of rotation of the rotor, being provided at the sealing gap.

In flow machines, radial sealing gaps which are axially flowed through frequently arise between the rotating parts and the stator parts and must be kept small in order to keep leakage losses low. Many fluids are provided with solid parts which can lead to abrasive wear in such narrow sealing gaps. This is caused on the one hand by the rotation of the rotor and on the other hand by a pressure difference which is effective over the sealing gap in the axial direction. A widening of the sealing gap increases the loss flow and reduces the volumetric efficiency.

Up to a certain quota of solid parts, one resorts to coating the surfaces in the sealing gap with a wear-resistant protective coating, the lifetime of which is given through the nature of the operation. When the repair intervals become too short, therefore, there remains only the use of self-supporting wear rings of ceramic materials. These admittedly have a very high wear resistance, but are however constructionally difficult to handle, since they are rather brittle and can be manufactured only in simple shapes due to their wear resistance. A further disadvantage in comparison with other materials consists in their insufficient coefficients of thermal expansion in connection with their low elasticity, which represents a risk for the operator of a flow machine, such as for example a multistage radial pump, when a wear ring is stretched at its inner side. Temperature fluctuations in the flow medium, but also certain operating situations such as the forwarding against a closed slider, which can likewise lead to a temperature increase, can lead to impermissible tension stresses in a wear ring of this kind.

In a wear ring which is stretched at its outer jacket surface and the wear surface of which lies on the inner side, a lowering of the temperature results in a uniformly distributed increase of the compression stress, which is as a rule permissible. If rather higher temperatures are operated at, the outwardly held wear rings can be held in a shrink connection, which in spite of the greater thermal expansion of a holding metal part is still sufficient for the centering and the force transfer. The situation is different in wear rings which are provided with a wear surface on their outer jacket surface.

SUMMARY OF THE INVENTION

It is an object of the invention to make wear rings with low coefficients of thermal expansion which are provided on their jacket surface with a wear surface in order to make them usable for flow machines in a large range. This object is satisfied in that the wear ring consists of a material with a lower thermal expansion than parts on which it is supported; in that it lies hollowly on its inner jacket surface up to a specific temperature intended for the sealing gap; and in that a first conical holder surface encounters with the apex of its cone a second holder surface, which is designed as a straight shoulder, in the plane of the latter on the axis of rotation or encounters a second holder surface, which is designed as a conical holder surface, at its cone apex on the axis of rotation.

This arrangement has the advantage that the conical holder surfaces, which expand to a greater extent than the wear ring when the temperature increases, expand along their cone jacket lines relative to the wear ring. If the axial bias force on the cone surfaces is not chosen too large—the wear ring also expands somewhat—then a minimum sliding movement between the conical surfaces can take place, which prevents excessive ring tensions in the form of tension stresses in the wear ring. With a straight shoulder as holder surface this minimum sliding movement is likewise possible. In the frictionless state a straight shoulder with an oppositely lying cone surface would also effect a centering of the wear ring with falling temperature. Due to the friction it can therefore be advantageous to additionally attach to the side of the straight shoulder an outer centering shoulder, the shrinking tension of which is still permissible at the lowest arising temperatures. In this way an exact centering at the straight shoulder in each temperature cycle is achieved.

This construction shows advantages in wear rings with a coefficient of thermal expansion $\alpha$ of less than $10 \times 10^{-6}$ degrees C. Wear rings of highly wear-resistant material such as ceramics, for example metal oxides, tungsten carbide or silicon carbide, can be used in this way. Even fluids with larger solid components can be forwarded. In this the diameter of individual solid parts can have the size of the gap width of the sealing gap, since a kind of grinding process for these large parts arises due to the choice of the wear rings. This process has a favorable effect at high operating temperatures above 100° C. and/or above 300° C., since ceramic materials change their wear properties only at much higher temperatures.

DESCRIPTION OF THE PREFERRED EMBODIMENT

Figure 1:
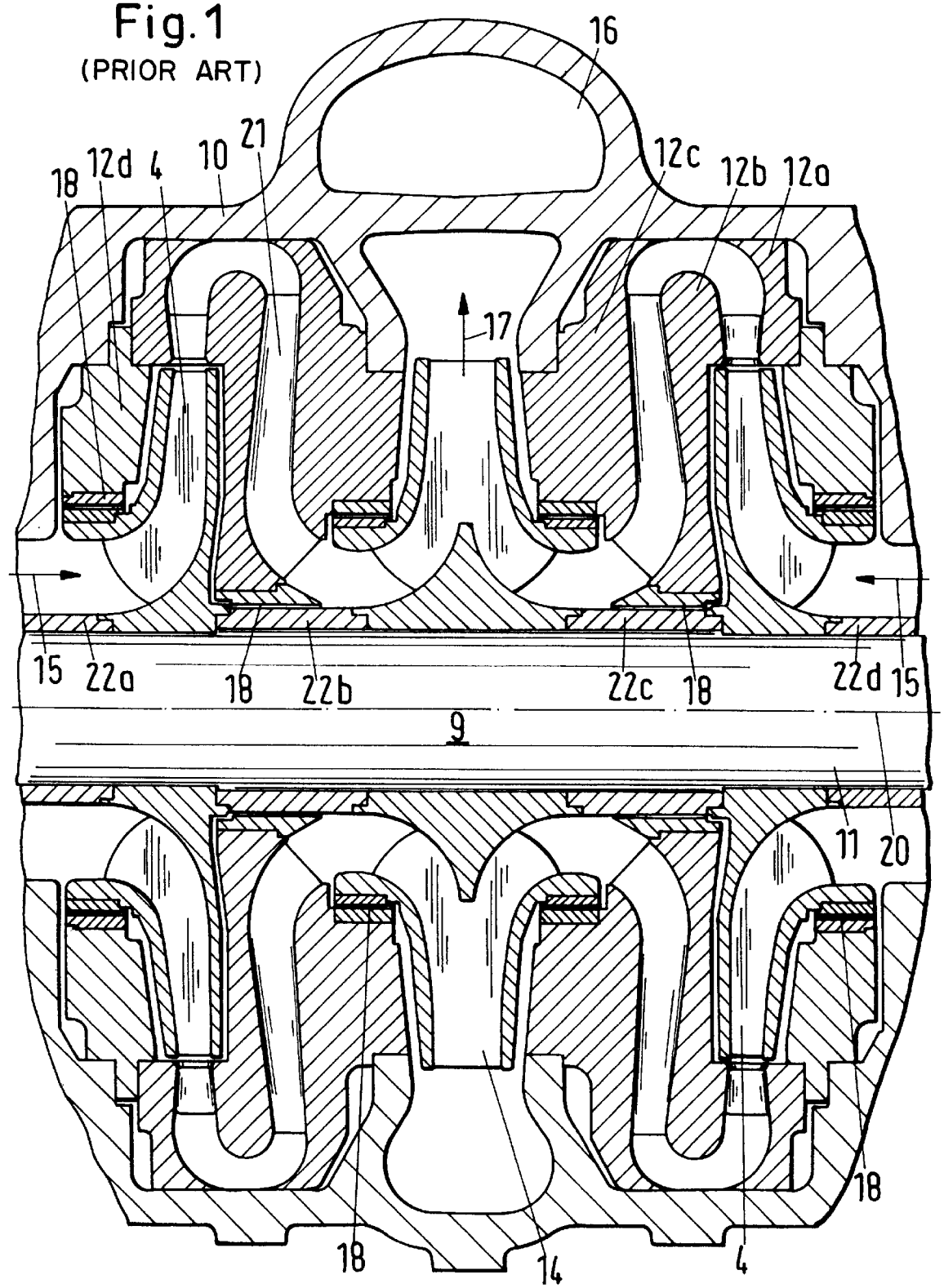
FIG. 1 is a section through a double-flow, prior art pump with wear rings which are shrunk in at rotors and stator parts.

In the figures, self-supporting wear rings $1a$, $1b$ for flow machines with a fluid are shown, which are arranged at a radial sealing gap 18 to a rotor 9 and the outer jacket surface 3 of which is provided with a wear surface 2. The wear rings $1a$, $1b$, which are fixed in the axial direction, consist of a material with a lower coefficient of thermal expansion than their support and lie hollowly on their inner jacket surface, with a first conical holder surface 8 encountering with the apex of its cone a second holder surface 8", which is designed as a straight shoulder, in the plane 19 of the latter on the axis of rotation, or with a second holder surface, which is designed as a conical holder surface 8', encountering the axis of rotation 20 at its cone apex.

In the following figures, the same reference symbols will be used for similar functional parts.

In FIG. 1 a known arrangement of a double-flow radial pump with closed rotors 4, 14, a housing 10 and stator parts 12a, 12b, 12c, 12d is shown. An inlet flow 15 flows through a first rotor 4, experiences a pressure increase and is conducted via a deflection passage 21 to a second rotor 14, and then after a further pressure increase leaves the housing 10 as outlet flow 17 via an outlet spiral 16. The rotor 9 with an axis of rotation 20 is assembled from a shaft 11, rotors 4, 14 and shaft sleeves 22a, 22b, 22c, 22d. Bearings and housing seals are not shown. Radial sealing gaps 18 are produced with shrunk-in wear rings at the cover disc of the rotors 4, 14. In the first rotors 4, further sealing gaps 18 are provided behind the rotor at the hub side.

Figure 2:
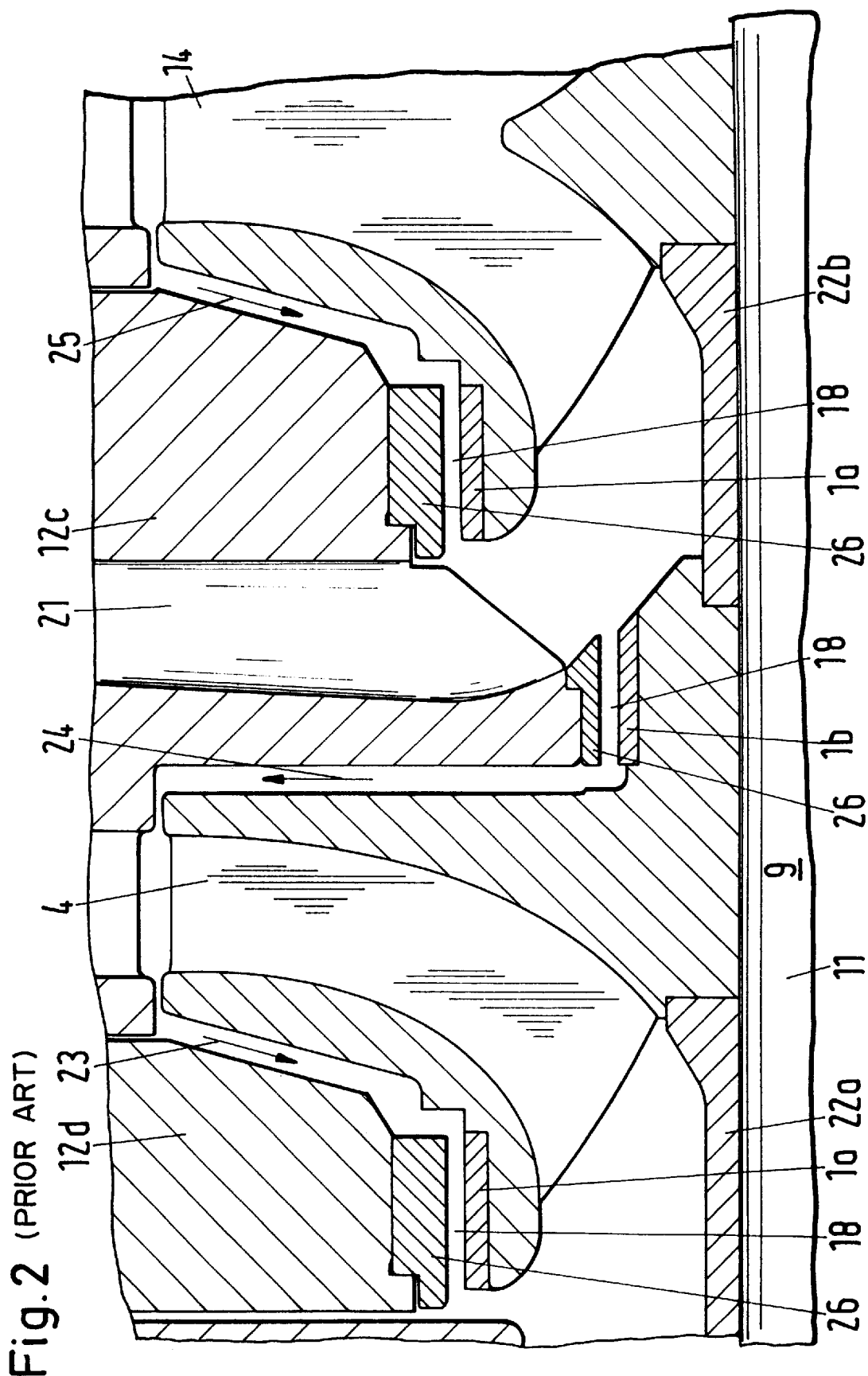
FIG. 2 is an enlarged, partial section similar to FIG. 1, in which the leakage flows through the radial sealing gaps are illustrated.

The enlarged section in FIG. 2 shows leakage flows 25, 24, 23, which flow back in accordance with the pressure gradient between the rotor 9 and the stator parts 12c, 12d. The back-flow amount is determined through the gap width of the radial sealing gaps 18. The latter consist of a counter ring 26 which is shrunk in a stator part 12c, 12d and of a wear ring 1a, 1b which is secured on the rotating part 4, 14 and of which the outer jacket surface is formed as a wear surface.

Figure 3:
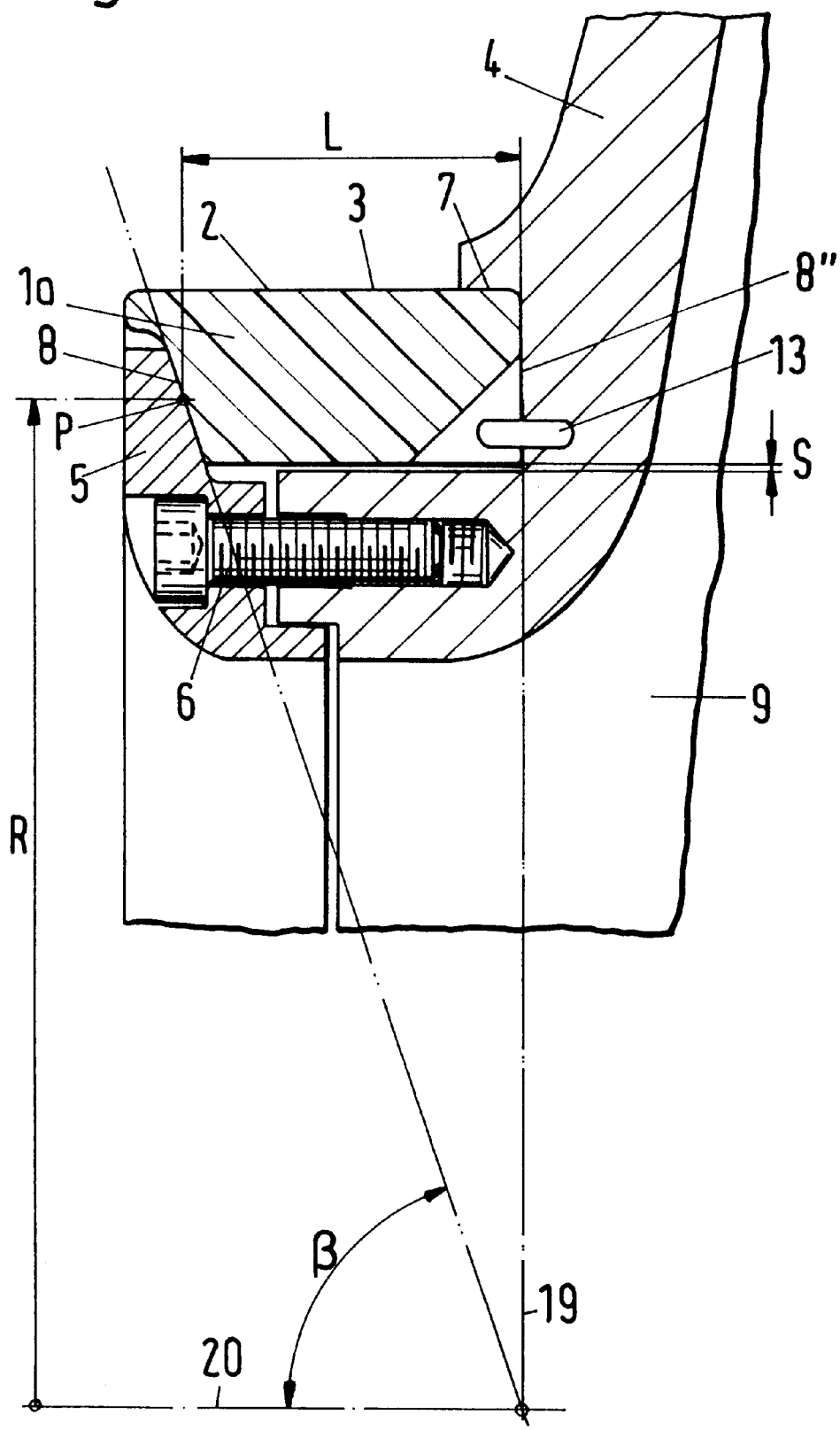
FIG. 3 is a fragmentary, enlarged, cross-sectional view of a first embodiment of the invention for a wear ring at a rotor.

In FIG. 3 the wear ring 1a is provided on its outer side with a cylindrical jacket surface 3 which is at the same time formed as a wear surface 2. The inner cylindrical jacket surface lies hollowly and forms a gap S to the rotor 4. The wear ring is supported in the axial direction at an end surface by a holder surface in the form of a straight shoulder 8" which is perpendicular to the axis of rotation 20. On the opposite side a holder ring 5, which is in turn centered at the rotor 4 and is held by screws 6, presses the wear ring 1a with a conical holder surface 8 in the axial direction. The conical surface 8 belongs to a cone with half cone angle β, with the apex of the cone encountering a plane 19, in which the straight shoulder 8" lies, on the axis of rotation 20. In addition to the friction of the holder surfaces 8, 8", a rotational securing 13 in the form of a pin which lies in a groove of the wear ring 1a can transfer torque from the rotor 4 to the wear ring.

If it is assumed that the lowest operating temperature is present in the shown position, then the gap S should be dimensioned in such a manner that the gap S disappears at a specific operating temperature as a result of the greater thermal expansion of the rotor without impermissible tension stresses arising in the wear ring 1a at the highest operating temperature.

If the plane 19 of the straight shoulder 8" is taken as a starting basis in order to describe the movement during an increasing heating up of a point P which is common to the holder surface 8 and the wear ring 1a, then the holder ring 5 expands in the axial direction proportionally to $L \times \Delta T \times \alpha_L$, with L being the distance from the plane 19, $\Delta T$ the difference in temperature in degrees Celsius and $\alpha_L$ the coefficient of thermal expansion of the rotor 4. At the same time the holder ring expands relative to the axis of rotation 20 in the radial direction proportionally to $R \times \Delta T \times \alpha_L$, with R being the radial distance from the point P. The rising of the point P thus amounts to:

$$\frac{R \times \Delta T \times \alpha_L}{L \times \Delta T \times \alpha_L} = \frac{R}{L} = \tan\beta = \text{constant}$$

Analogously the rising of the original point P can be determined for the wear ring 1a with a coefficient of thermal expansion $\alpha_v$:

$$\frac{R \times \Delta T \times \alpha_V}{L \times \Delta T \times \alpha_V} = \frac{R}{L} = \tan\beta = \text{constant}$$

This means that the holder surface 8' and the wear ring which is held by it move with different speeds on the same conical surface with the half cone angle β. If the friction between the holder surface 8 and the wear ring 1a is dimensioned such that in the more rapid expansion of the holder ring and the rotor no impermissible tension stresses arise in the wear ring, then there exists a fixing which permits the temperature dependent displacement between the holder ring 5 or the rotor 4, respectively, and the wear ring. It is thus sufficient to design the holder screws 6 for example as necked-down bolts and tighten them in such a manner that no excessively large frictional forces can arise. A further aid in the mounting of the wear ring 1a consists in an additional centering shoulder 7 which lies in contact at the outer jacket surface 3 of the wear ring at low temperatures and departs from it at increasing temperatures. As long as the angle β is not chosen to be too close to 90°, a continuous centering of the wear ring 1a on the holder surface 8 of the holder ring 5 takes place.

Figure 4:
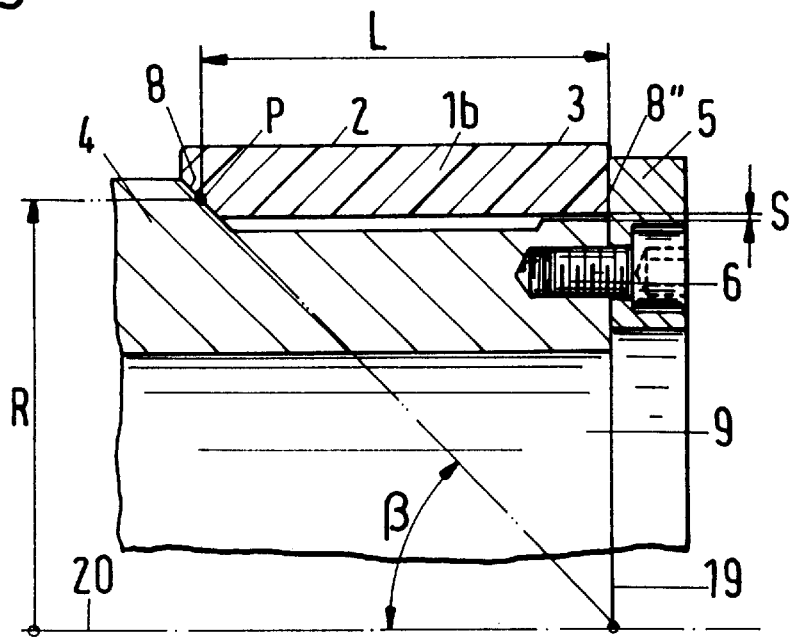
FIG. 4 is a fragmentary, enlarged, cross-sectional view of a further embodiment of the invention with a rotating sleeve.

In FIG. 4 the length L of a wear ring 1b in relationship to the radial distance R is chosen to be greater than in FIG. 3. In this the half cone angle P becomes smaller and a better centering through the holder surface 8 takes place. Simultaneously with the improved centering a greater tension stress also arises in the wear ring 1b. The pressing force on an oppositely lying holder surface 8" of a holder ring 5 must therefore be matched to the spreading action of the cone.

Figure 5:
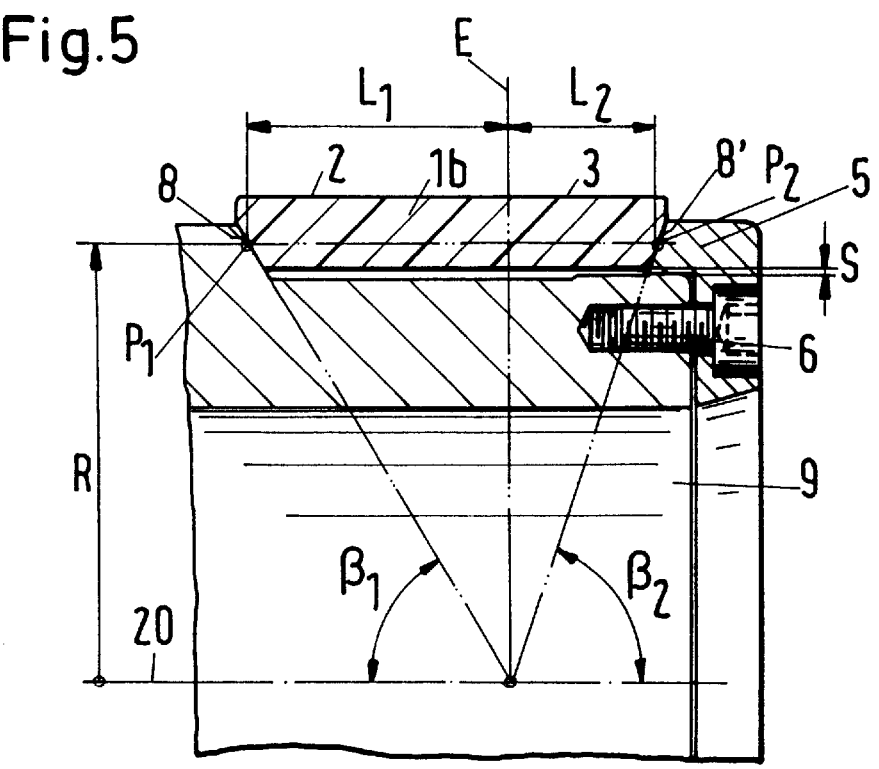
FIG. 5 is a fragmentary, enlarged, cross-sectional view of a further embodiment of the invention with two conical holder surfaces.

In FIG. 5 the length of the wear ring 1b is composed of two sub-lengths $L_1$ and $L_2$. Since the sum $L_1+L_2$ corresponds approximately to the radial distance R, well centering half cone angles $\beta_1$ and $\beta_2$ are created. In relation to a theoretical separation plane E which is perpendicular to the axis of rotation 20 and passes through the intersection of the two cone apexes, two oppositely lying points $P_1$ and $P_2$ move in the holder surfaces 8 and 8' with increasing temperature at the same radius on the respective conical surface.

Figure 7:
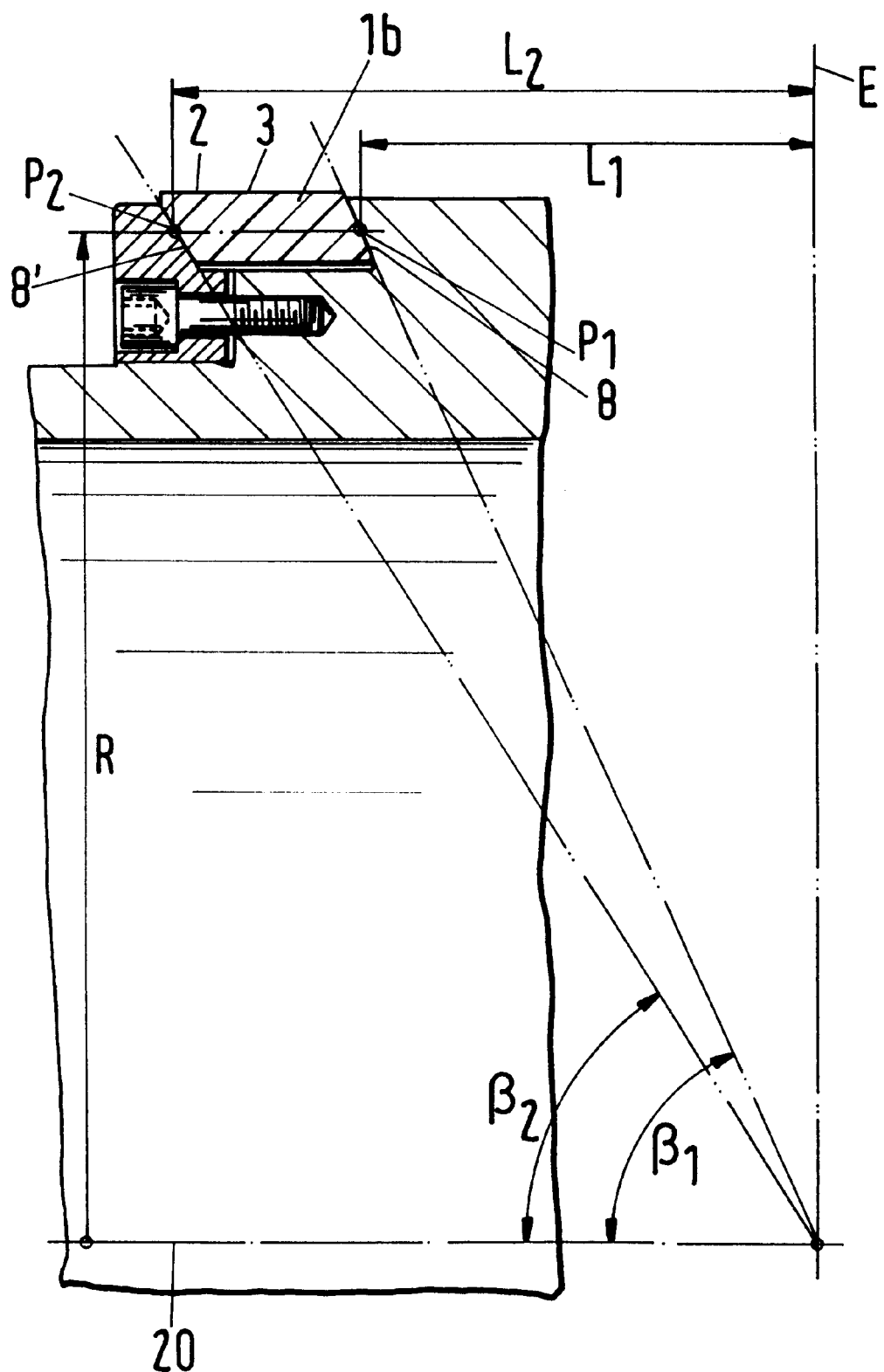
FIG. 7 is a fragmentary, enlarged, cross-sectional view of a further embodiment of the invention with two conical holder surfaces.

There are constructional restrictions in which the length of the wear ring must be chosen substantially smaller than the radial distance R of the holder surfaces 8, 8'. Nevertheless it is possible to achieve a good centering, i.e. half cone angles β1, β2 of similar size for the wear ring 1b if the point of contact of the two cone apexes is displaced relative to the wear ring on the axis of rotation 20 in a direction such as is shown in FIG. 7. There the theoretical separation plane E lies outside the wear ring. The effective length of the wear ring 1b results from the difference $L_2-L_1$. The wear ring 1b experiences a ring stress which is a compression stress through the holder surface 8 with the larger half cone angle $\beta_1$ and a ring stress which is a tension stress through the holder surface 8' with the half cone angle $\beta_2$. The points $P_1$ and $P_2$ of the holder surfaces move along the cone surfaces in temperature fluctuations.

Figure 6:
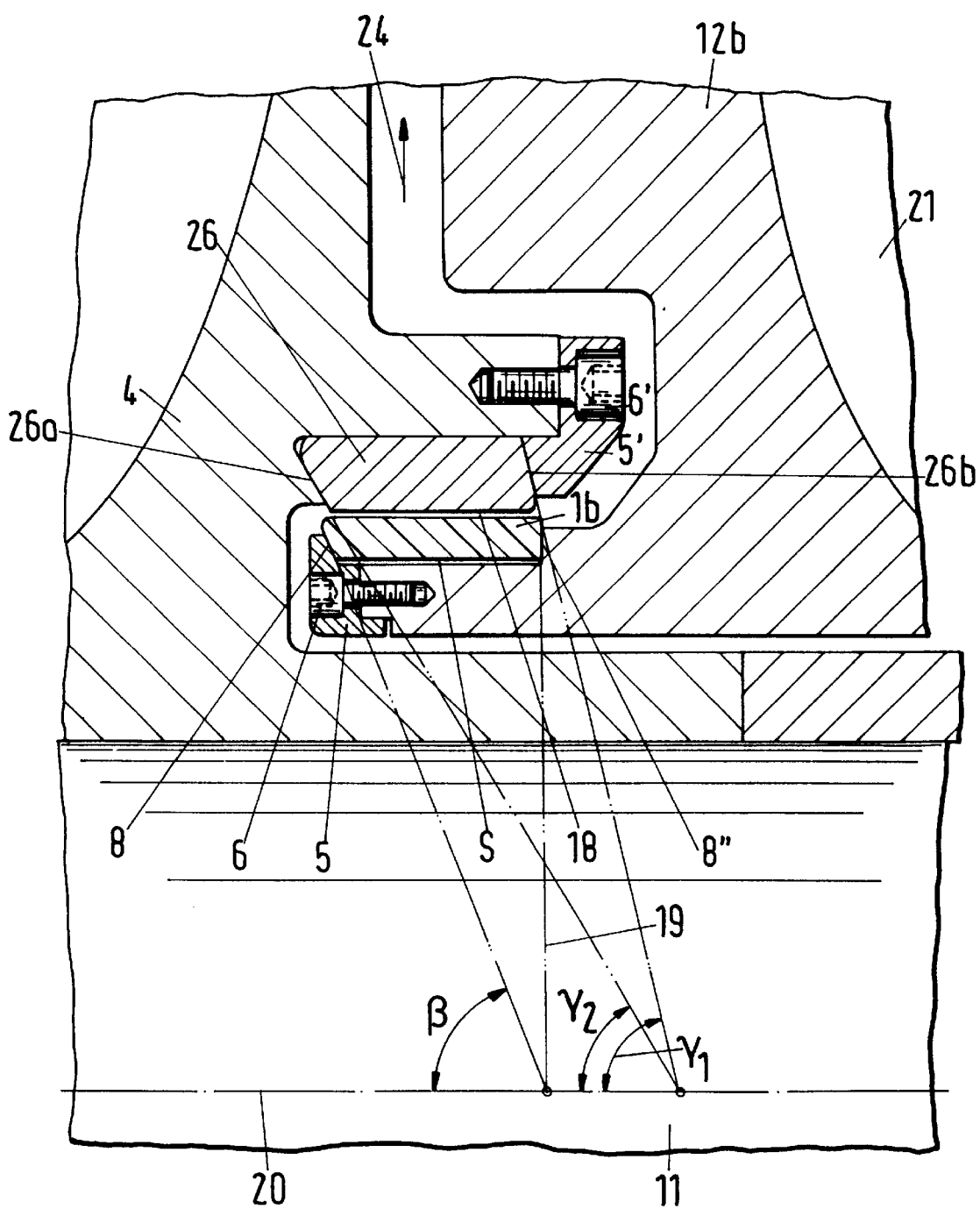
FIG. 6 is a fragmentary, enlarged, cross-sectional view of a further embodiment of the invention with a stationary sleeve.

In FIG. 6 a wear ring 1b is centered and secured analogously to FIG. 4, with the holder ring 5 and a stator part 12a, at which a sleeve is molded on, forming non-rotating holder surfaces 8 and 8". A rotating counter ring 26 is held at the rotor 4 with holder screws 6'. This counter ring 26 can likewise consist of a ceramic and have conical holder surfaces, the cone apexes of which make contact on the axis of rotation 20. In temperature increases, the rotor 4 and the holder ring 5' run off outwardly more rapidly with respect to the counter ring 26 on the cone surfaces with half cone angle γ1, γ2, and a gap arises at the outer jacket surface of the counter ring. Nevertheless a reasonable centering of the counter ring via the half cone angles γ1, γ2 is possible. At very large temperature differences or much greater coefficients of thermal expansion of the rotor 4 and the holder ring 5' relative to the counter ring 26, this is likewise a conceivable solution, if the counter ring 26 cannot remain shrunk in over the entire temperature range.

What is claimed is:

1. A flow machine for fluid comprising stator parts and a rotor separated by a sealing gap, and a wear ring disposed in the sealing gap and having an outer jacket surface provided with a wear surface, the wear ring being axially fixed in a direction of an axis of rotation of the rotor, being made of a material with a lower coefficient of thermal expansion than parts on which it is supported, and lying hollowly on its inner jacket surface when the temperature at the sealing gap is below a specific temperature, the wear ring being held in place by first and second conical holder surfaces which converge towards the axis of rotation and meet at a common apex on the axis of rotation.

2. A flow machine according to claim 1 wherein the second conical holder surface is perpendicular to the axis of rotation.

3. A flow machine according to claim 1 wherein the second conical holder surface is angularly inclined relative to the axis of rotation by an angle other than 90°.

4. A flow machine according to claim 1 including a centering shoulder on a part supporting the wear ring for outwardly centering the wear ring at its jacket surface when the lowest operating temperature occurs at the gap.

5. A flow machine according to claim 1 wherein the wear ring is made of a material which has a coefficient of thermal expansion of less than $10 \times 10^{-6}$ degrees C.

6. A flow machine according to claim 5 wherein the wear ring is made of a ceramic.

7. A flow machine according to claim 6 wherein the ceramic is selected from the group consisting of metal oxides, tungsten carbide and silicon carbide.

8. A flow machine for a fluid comprising stator parts and a rotor separated by a sealing gap, a counter ring disposed in the sealing gap and having an inner jacket surface provided with a wear surface, the counter ring being axially fixed in a direction of an axis of rotation of the rotor, being made of a material with a lower coefficient of thermal expansion than parts on which it is supported, and lying hollowly on its outer jacket surface at lower temperatures which occur at the sealing gap, the counter ring being held in place by first and second conical holder surfaces which converge in a direction towards the axis of rotation and meet at a common apex on the axis of rotation.

9. A flow machine for fluid comprising stator parts and a rotor separated by a gap, the rotor being rotatable about an axis of rotation, and a wear ring disposed in the gap and having an outer jacket surface provided with a wear surface, the wear ring being fixed in an axial direction of the rotor, being made of a material with a lower coefficient of thermal expansion than parts on which it is supported, and having an inner jacket surface that is out of contact with the parts supporting it when the temperature at the gap is below a predetermined temperature, the ring being held in place by first and second conical holder surfaces each of which converges towards the axis of rotation and forms an apex on the axis of rotation.

10. A flow machine for fluid comprising a stator and a rotor rotatable about an axis of rotation, the stator and the rotor forming an interface with a sealing gap through which fluid flowing through the machine can leak, the sealing gap being defined by a counter surface connected with one of the stator and the rotor and a wear ring connected with the other one of the stator and the rotor and having a wear surface opposite the counter surface and spaced therefrom by the sealing gap, the wear ring being constructed of a material having a coefficient of thermal expansion which is smaller than a coefficient of thermal expansion of material of which one of the stator and the rotor to which the wear ring is connected is constructed, the wear ring being dimensioned and arranged so that a surface thereof which faces in a radial direction is spaced from the one of the stator and the rotor to which it is connected by another gap when the wear ring is at a relatively low operating temperature and the other gap substantially disappears at a pre-established highest operating temperature, the one of the stator and the rotor to which the wear ring is connected including a connector for securing the wear ring thereto so that a more rapid expansion of the one of the stator and the rotor to which the wear ring is connected relative to the wear ring as the temperature increases towards the pre-established highest operating temperature causes a reduction in the size of the other gap and prevents an excessive tension increase in the wear ring.

11. A flow machine according to claim 10 including axially spaced-apart, cooperating converging surfaces defined by the one of the stator and the rotor to which the wear ring is connected and the wear ring which frictionally secure the wear ring to the one of the stator and the rotor to which it is connected while permitting temperature-induced, relative movement between them to accommodate differences in their thermal expansion.

12. A flow machine according to claim 11 wherein the converging surfaces are conical surfaces each of which has an apex on the axis of rotation.

13. A flow machine according to claim 12 wherein the apices of the conical surfaces meet at a common point on the axis of rotation.

14. A flow machine according to claim 12 wherein one of the conical surfaces is a flat surface that is perpendicular to the axis of rotation.

15. A flow machine according to claim 10 wherein the wear ring is connected to the rotor.

16. A flow machine according to claim 10 wherein the wear ring i s connected to the stator.

17. A flow machine according to claim 10 wherein the counter surface is defined by a ring.

18. A flow machine according to claim 17 wherein the ring defining the counter surface has a radially facing surface in contact with the one of the stator and the rotor to which it is connected.

19. A method of operating a flow machine for a fluid comprising providing a stator part and a rotor part of the flow machine, separating the stator part and the rotor part by a sealing gap, rotating the rotor about an axis of rotation, mounting a wear ring on one of the stator part and the rotor part so as to prevent movement of the wear ring in the direction of the axis of rotation, providing the wear ring with a wear surface facing the sealing gap, selecting a material for the wear ring that has a lower coefficient of thermal expansion than one of the stator part and the rotor part to which the wear ring is connected, holding the wear ring in place with first and second conical holder surfaces each of which converges toward the axis of rotation and forms an apex on the axis of rotation, forming a spacing between radially facing, opposing surfaces of the wear ring and the one of the stator part and the rotor part to which the wear ring is connected permitting relative radial movements between the wear ring and the one of the stator part and the rotor part to which it is connected due to thermal expansion until a predetermined temperature is reached, providing a fluid to be flowed through the flow machine, and entraining solids in the fluid before the fluid enters the flow machine.

20. A method according to claim 19 including arranging the first and second conical holder surfaces so that their apices are at a common point on the axis of rotation.

21. A method according to claim 19 wherein the solids have a particle diameter, and wherein the gap has a radial width of the order of magnitude of the particle diameter.

22. A method according to claim 19 wherein the temperature of the flow machine is greater than 100° C.

23. A method according to claim 19 wherein the temperature of the flow machine is greater than 300° C.

* * * * *